United States Patent [19]

Bianchini et al.

[11] Patent Number: 4,993,537

[45] Date of Patent: Feb. 19, 1991

[54] APPARATUS FOR CORRECTLY POSITIONING DISPENSERS TO BE APPLIED TO CONTAINERS

[75] Inventors: Ivo Bianchini; Carlo Corniani, both of Marmirolo; Claudio Sogliani, Cerese Di Virgilio, all of Italy

[73] Assignee: Azionaria Costruzioni Macchine Automatiche A.C.M.A. S.p.A., Bologna, Italy

[21] Appl. No.: 524,535

[22] Filed: May 17, 1990

[30] Foreign Application Priority Data

May 25, 1989 [IT] Italy ................................ 3487 A/89

[51] Int. Cl.[5] ............................................ B65G 47/24

[52] U.S. Cl. ...................................... 198/395; 53/308; 53/367; 198/418.4

[58] Field of Search ..................... 198/394, 395, 418.4; 53/367, 306, 308, 312

[56] References Cited

U.S. PATENT DOCUMENTS

| | | | |
|---|---|---|---|
| 3,040,492 | 6/1962 | Stover et al. | 53/367 X |
| 3,054,240 | 9/1962 | Dimond | 53/367 X |
| 3,415,037 | 12/1968 | Bergeron et al. | 53/308 |
| 3,451,523 | 6/1969 | Evans, Jr. et al. | 198/395 X |
| 3,618,743 | 11/1971 | Benatar | 198/395 X |
| 3,628,650 | 12/1971 | Rouse | 198/395 X |
| 3,714,755 | 2/1973 | Phalin et al. | 53/308 X |
| 3,755,987 | 9/1973 | Dardaine et al. | 53/306 X |
| 3,777,449 | 12/1973 | Sindermann | 53/306 X |
| 3,882,660 | 5/1975 | Sterling | 53/308 |
| 4,373,316 | 2/1983 | Kobayashi | 53/306 X |
| 4,428,474 | 1/1984 | Gau et al. | 198/394 |
| 4,441,955 | 4/1984 | Richardson et al. | 198/418.4 X |
| 4,559,759 | 12/1985 | Herbert | 53/308 |

FOREIGN PATENT DOCUMENTS

| | | | |
|---|---|---|---|
| 2734599 | 2/1979 | Fed. Rep. of Germany | 53/308 |

*Primary Examiner*—D. Glenn Dayoan

*Attorney, Agent, or Firm*—Guido Modiano; Albert Josif

[57] ABSTRACT

Apparatus for correctly positioning dispensers to be applied to containers, wherein containers and dispensers are fed in succession to an aligning conveyor which comprises a plurality of housings adapted to receive respective dispensers and to support them rotatably about their respective axes. A fixed abutment element is arranged adjacent to the aligning conveyor and is adapted to interfere with a portion of the peripheral surface of the dispensers to cause a rotation of the dispensers about their respective axes during their movement on the aligning conveyor. A photocell is provided for sensing the position assumed by a given portion of each rotating dispenser, and suckers are also provided and controlled by the photocell in order to lock each dispenser within the related housing when a given position is reached.

8 Claims, 3 Drawing Sheets

FIG. 4
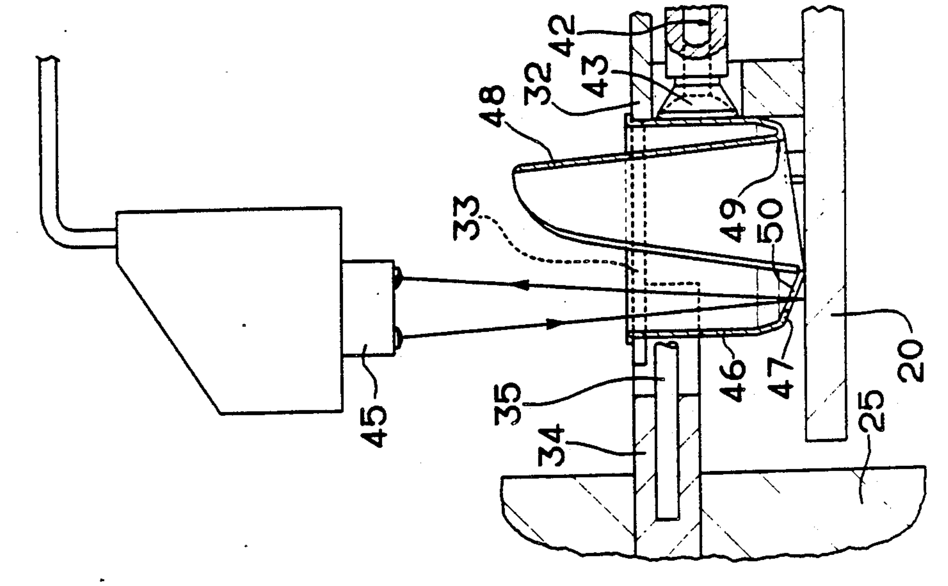
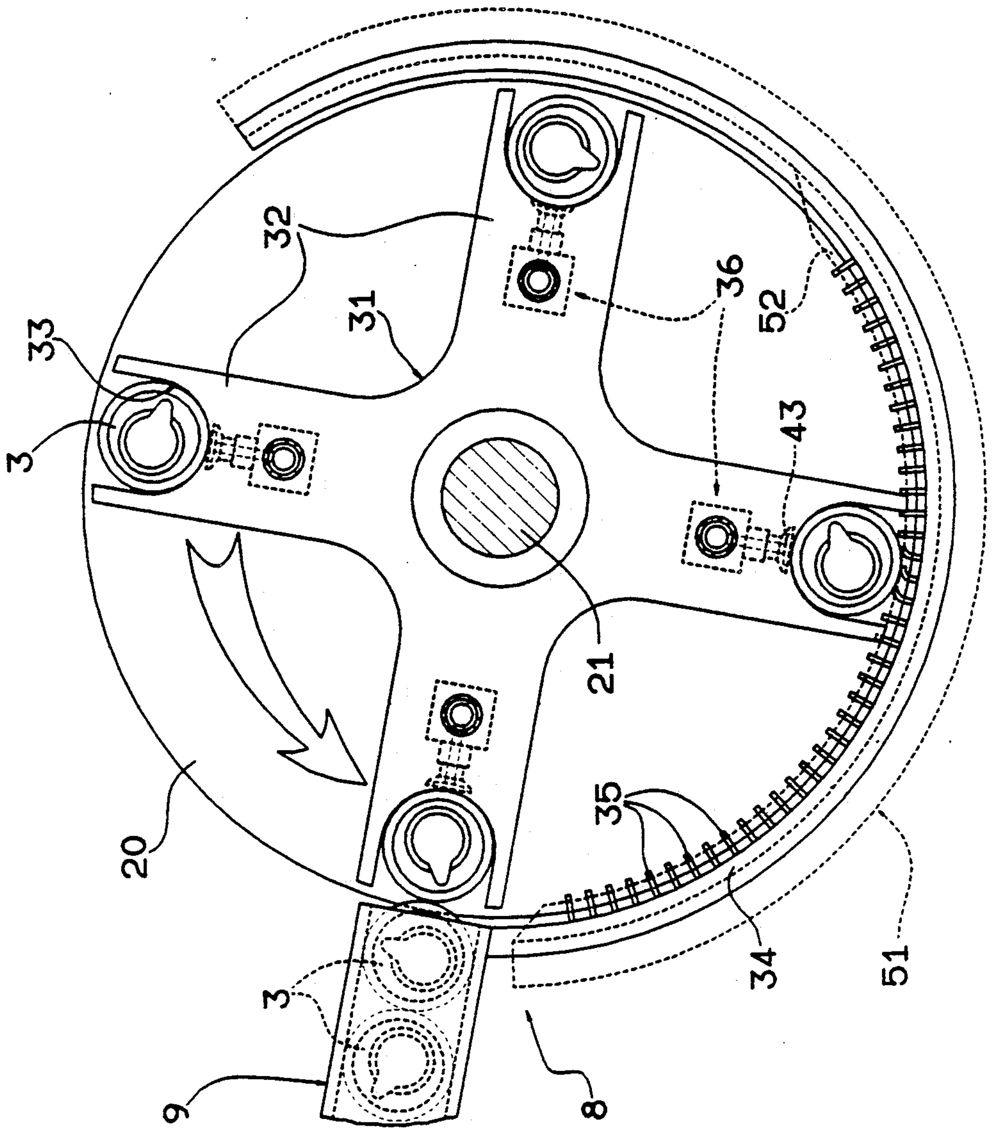
FIG. 3

APPARATUS FOR CORRECTLY POSITIONING DISPENSERS TO BE APPLIED TO CONTAINERS

BACKGROUND OF THE INVENTION

The present invention relates to an apparatus for correctly positioning dispensers to be applied to containers.

In particular, the present invention relates to an apparatus for transferring dispensers, having a lip for dispensing a liquid, and for positioning them correctly before they are applied to containers preferably provided with a handle.

As known, containers are available which usually contain liquid products, have a handle and are provided upward with a dispenser which comprises a lip adapted to allow the outflow of the liquid on the side opposite to the handle side. The dispensers must be applied to the respective containers taking care that said lip is arranged in the opposite region with respect to the handle, so that the liquid can be dispensed from the containers in a comfortable and correct manner.

Apparatus are known which are adapted to correctly place the dispensers before they are applied to the containers and in which fixed guiding means are provided, which are adapted to engage given portions of the dispensers during the transit thereof toward the application station. However, it has been observed that the adoption of such fixed guiding means does not always allow regular placement of the dispensers and causes rejection of containers to which the dispenser has not been applied correctly. These rejects are obviously the cause of a decrease in the productivity of the machines is which the described known apparata are installed.

SUMMARY OF THE INVENTION

The aim of the present invention is to provide an apparatus for correctly positioning dispensers with respect to containers to which they are to be applied which is capable of providing better performance than known apparata, and which is capable of positioning the dispensers correctly without causing such container rejections.

According to the present invention, an apparatus for correctly positioning dispensers to be applied to containers is provided which comprises first means for feeding containers intended to receive respective dispensers which substantially have the shape of a body of revolution, first conveyor means adapted to receive said containers from said first conveyor means, second conveyor means adapted to receive said dispensers in succession, second feeder means adapted to feed in succession said dispensers to said second conveyor means, and third conveyor means for receiving said containers and said dispensers respectively from said first conveyor means and from said second conveyor means, characterized in that said second conveyor means comprise a conveyor provided with a plurality of housings adapted to receive respective dispensers and to rotatably support them about their respective axes, there being provided a fixed abutment element arranged adjacent to said conveyor and adapted to interfere with at least part of the peripheral surface of said dispensers to cause a rotation of said dispensers about their respective axes during their movement caused by said conveyor, means for sensing the position assumed by a given portion of each of said dispensers during its rotation about its own axis, and retention means supported by said conveyor to lock each of said dispensers within the related housing when said sensing means detect that a given position has been reached by said given portion of each of said dispensers.

BRIEF DESCRIPTION OF THE DRAWINGS

The present invention will now be described with reference to the accompanying drawings, which illustrate a non-limitative embodiment thereof, wherein:

FIG. 3 is a fragmentary plan view of the portion of the apparatus illustrated in FIG. 2; and FIG. 4 is an enlarged-scale view of a detail of the apparatus of FIGS 1 to 3.

DESCRIPTION OF THE PREFERRED EMBODIMENTS

Figure 1:
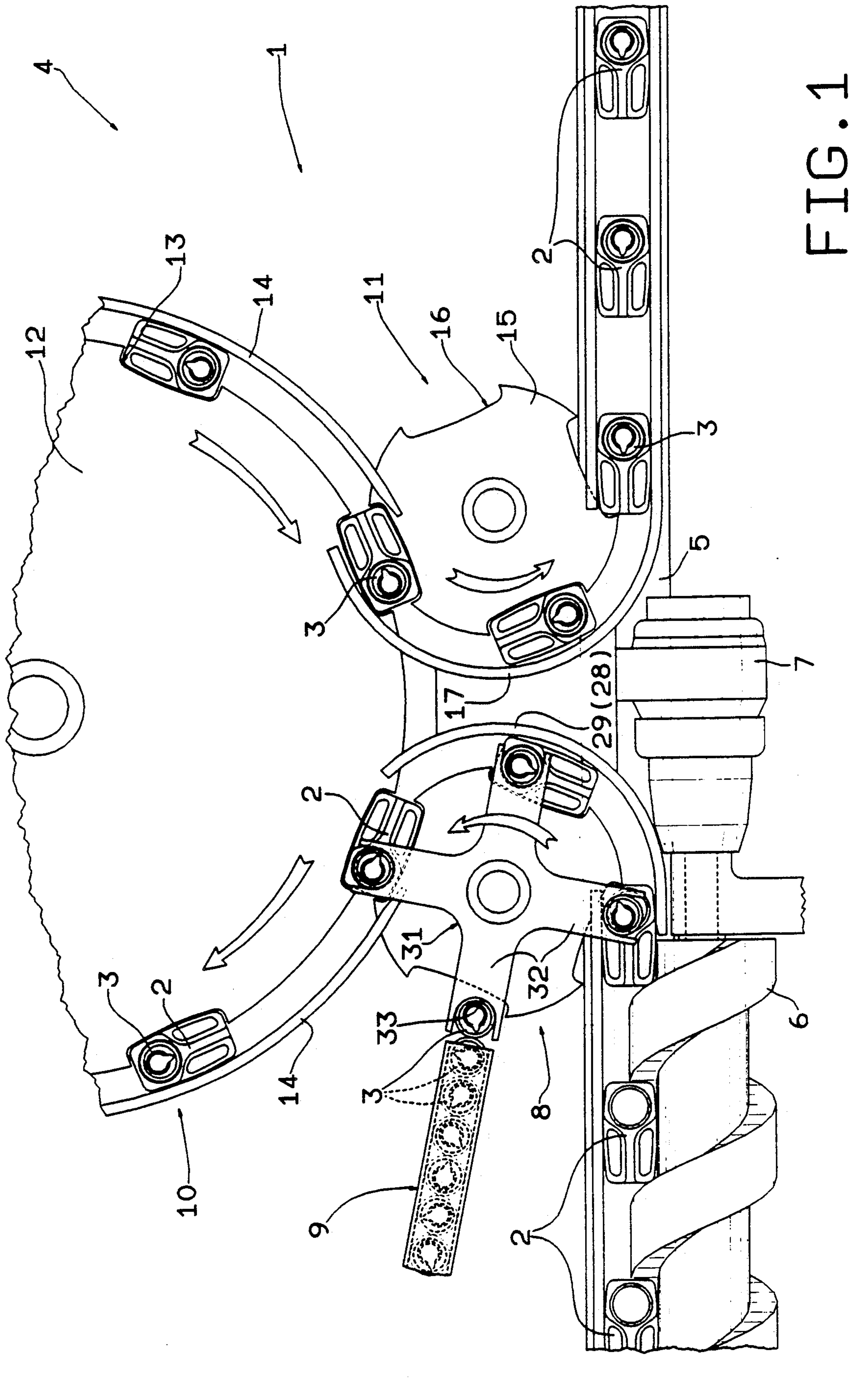
FIG. 1 is a schematic plan view, with parts removed for the sake of clarity, of a portion of a container filling machine which includes an apparatus provided according to the present invention.

With reference to FIG. 1, the reference numeral 1 generally indicates an apparatus for transferring products constituted for example by containers 2 and dispensers 3, which is a part of a machine for filling containers 2 with liquid substances which is illustrated only partially and generally indicated by the reference numeral 4.

The transfer apparatus 1 comprises feeder means constituted by a substantially horizontal conveyor belt 5 a first portion whereof is flanked and partially surmounted by a worm screw conveyor 6 which is driven by a motor 7 and is capable of transferring in succession the containers 2 toward a rotary aligning conveyor 8 which is adapted to transfer the containers 2 along a circular path. A conveyor means, which comprises a known linear pneumatic conveyor 9, feeds in succession dispensers 3 to the aligning conveyor 8 upstream of the region of substantial tangency between the aligning conveyor 8 and the belt conveyor 5 with reference to the direction of rotation of said aligning conveyor 8. The aligning conveyor 8 passes in succession the containers 2 and the related dispensers 3 to a conveyor means constituted by a rotating applicator conveyor 10 which applies, in a manner which is known and thus not described, the dispensers 3 to the containers 2 and sends the containers 2, provided with a dispenser 3, to a further rotary output conveyor 11 which carries the containers 2, provided with a dispenser 3, onto a portion of the belt conveyor 5 which is arranged downstream of said portion which is adjacent to the worm screw conveyor 6.

The applicator conveyor 10 essentially comprises a drum 12 with a vertical axis, which has a clockwise rotary motion (with reference to FIG. 1) and has, on its periphery, a plurality of equally mutually spaced housings or seats 13, each of which is adapted to accommodate a container 2 and a dispenser 3. Part of the periphery of the drum 12 is flanked by a fixed curved guide 14 which has the purpose of keeping the containers 2 and the dispensers 3 within the seats 13 during transfer on the conveyor 10.

The output conveyor 11 essentially comprises a drum 15 with a vertical axis which rotates in an anticlockwise direction (with reference to FIG. 1) and is provided, on its periphery, with a plurality of mutually equally spaced housings or seats 16, each of which is adapted to accommodate a container 2 to which a dispenser 3 has been applied. The periphery of the drum 15 is partially flanked by a fixed curved guide 17 which has the purpose of keeping the containers 2 within the seats 16 during transfer on the conveyor 11.

Figure 2:
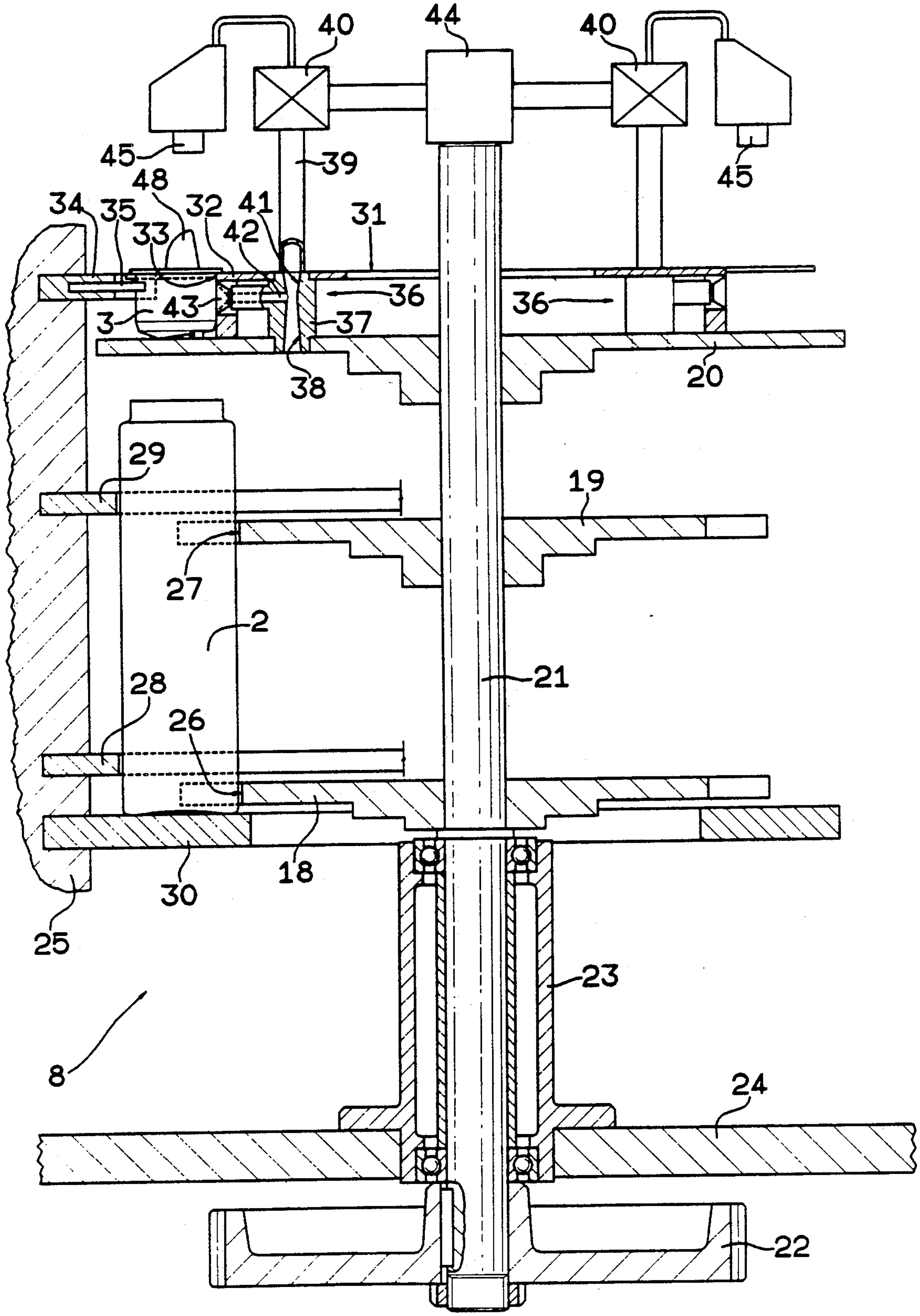
FIG. 2 is a sectional elevation view of a portion of an apparatus according to the present invention.

According to what is illustrated in particular in FIG. 2, the aligning conveyor 8 essentially comprises two conveyor means which a respectively constituted by a pair of disk-like elements 18, 19 and by a disk-like element 20 arranged substantially horizontally and are keyed on a vertical shaft 21 in that order from the bottom upward. Said shaft 21 is rotated by drive means which are not illustrated, by means of a gearwheel 22 keyed to its lower end, and is rotatably supported by means of a sleeve 23 which is rigidly associated with a horizontal wall 24, constituting part of the base 25 of the filling machine 4 and being arranged coaxial to a lower portion of said shaft 21.

The disk-like element 18 is keyed to the shaft 21 immediately above the sleeve 23, whereas the disk-like element 19 surmounts the disk-like element 18 and is spaced therefrom by an amount which approximates, but is smaller than, the height of a container 2. Both disk-like elements 18 and 19 have, on their periphery, an equal number of respective housings or seats 26 and 27 which are mutually equally spaced and are vertically aligned in pairs so as to define housings for the containers 2 which arrive from the belt conveyor 5.

The aligning conveyor 8 is flanked, respectively proximate to the periphery of the disk-like elements 18 and 19 and along a portion comprised between its regions of substantial tangency to the belt conveyor 5 and to the applicator conveyor 10, by fixed curved guides 28 and 29 which are supported by the base 25 and have the purpose of keeping the containers 2 within the housings defined by the seats 26 and 27.

Directly below the disk-like element 18, the base 25 supports an annular element 30 which is coaxial to the shaft 21 and is adapted to support the containers 2 which occupy the housings defined by the seats 26 and 27.

The disk-like element 20 is keyed onto the shaft 21 at a higher level than the upper ends of the containers 2 accommodated in the seats 26 and 27, and one of its peripheral portions surmounts said containers 2.

The shaft 21 supports, above the disk-like element 20 in a centered position, a flattened element or horizontal conveyor means 31 in the shape of a cross with equal arms (see also FIG. 1). The ends of its four arms 32 extend above the seats 26 and 27 of the disk-like elements 18 and 19. A substantially semicircular housing or seat 33, adapted to receive a dispenser 3 from the conveyor 9, is defined in the free end of each arm 32.

According to what is illustrated in FIG. 3, during rotation of the shaft 21 the free ends of the arms 32 flank a fixed biasing or abutment element which is constituted by a curved housing 34 which is supported by the base 25 and extends substantially from the region in which the dispensers 3 are fed into the seats 33 to a region proximate to the region of substantial tangency betwen the aligning conveyor 8 and the applicator conveyor 10. Said housing 34 supports a plurality of flexible tabs 35 which are mutually equally spaced and extend radially toward the axis of the conveyor 8. The tabs 35 have such a length as to interfere with the dispensers 3 accommodated in the seats 33 during the rotation of the conveyor 8.

Some suction elements 36, four in the described embodiment of the present invention, are superimposed and rigidly associated with the upper surface of the disk-like element 20 and are equal in number to the seats 33 defined on the element 21; each suction element is arranged adjacent to respective set 33 proximate to the shaft 21. Each of said suction elements 36 essentially comprises a block 37 which is internally traversed by a vertical duct 38; the lower end of said duct is connected to the atmoshphere, and the upper end is connected, by means of a duct 39, to a valve element or solenoid valve 40 which is rotatable together with the conveyor 8. Each duct 38 is in the shape of a Venturi tube, and has an intermediate neck-like portion or choke 41 which communicates, by means of a duct 42 defined in the related block 37, with a retention means comprising a sucker 43, the grip portion whereof faces towards one of said seats 33.

Each valve element 40 has its own input connected to a compressed air source 44 and can be actuated by a sensing means which comprises a reflection photocell 45 provided with an emitter and a receiver for a light beam. Each photocell 45 is supported by the conveyor 8 substantially above a respective seat 33 and is capable, according to what is illustrated in FIG. 4, of directing a substantially vertical light.beam toward the dispenser 3 contained within the seat 33 arranged below said photocell.

With reference to FIG. 4, each dispenser 3 substantially has the shape of a body of revolution, and is essentially constituted by a hollow cylindrical body 46 which is partially closed below by a base 47 from which a substantially vertical dispenser lip 48, connected to an opening 49 of the base 47, extends upward in an eccentric position. Said opening 49 comprises, in the example illustrated in FIG. 4, a circular portion which constitutes the base of the lip 48 and a passage 50 which is elongated toward the portion of the base 47 located opposite to the portion from which the lip 48 extends upwardly.

In use, the containers 2 are fed in succession, by the belt conveyor 5 and the worm-screw conveyor 6, into the housings defined by the seats 26 and 27 of the conveyor 8, whereas the pneumatic conveyor 9 feeds in succession the dispensers 3 into the seats 33 of the conveyor 8.

The conveyor 8 then passes in succession the containers 2 and the related dispensers 3 to the applicator conveyor 10, which applies the dispensers 3 to the containers 2 and conveys the containers 2, provided with dispenser 3, to the output conveyor 11, which carries the containers 2, provided with dispenser 3, onto a portion of the belt conveyor 5 which is arranged downstream of the portion adjacent to the worm-screw conveyor 6.

During accommodation within the seats 33 of the conveyor 8, the dispensers 3 are subjected to rolling during the rotation of said conveyor 8, i.e. to a rotation about their own axis, by virtue of the action of the flexible tabs 35 supported by the fixed housing 34.

At the instant in which the photocell 45 related to each seat 33 univocally senses that a given position has been reached by the opening 49 of a dispenser 3 by sensing the position assumed by a given portion of said opening, for example the passage 50, said photocell 45 sends an activation signal to the related solenoid valve 40, which connects the related duct 39 to the compressed air source 44.

Consequent to the creation of this connection, the sucker 43 associated with said duct 39 begins to exert a sucking action, since as mentioned it is connected to the choke of a Venturi tube at which the pressure is lower than the atmospheric pressure.

The dispenser 3 arranged facing said sucker 43 is thus locked by said sucker 43 and interrupts the rotation about its own axis caused by the tabs 35 of the housing 34.

Therefore each dispenser 3 contained within a seat 33 is locked by a sucker 43 in a given position after said dispenser 3 has rotated for a certain period of time about its own axis, and can be passed to the conveyor 10 in a position suitable to allow its correct application to a container 2.

According to another aspect of the present invention illustrated in broken lines in FIG. 3, the housing 34 amy be replaced with a housing 51 which does not have said tabs 35 and is provided with a covering 52, made of resilient material at its face directed toward the seats 33 and being adapted to interfere with the dispensers 3 which are contained within said seats 33.

Finally, it should be noted that, as an alternative to what has been described, said ducts 38 may have a cylindrical internal cross section, and may lead, by means of the related valve elements 40, to a suction pump instead of to said compressed air source 44.

From what has been described above, it is evident that the apparatus according to the present invention is capable of positioning dispensers correctly with respect to the containers to which they are to be applied, without causing the rejection of containers which are unavoidable in the mentioned known apparatus.

We claim:

1. Apparatus for correctly positioning dispensers to be applied to containers which comprises first feeder means for containers intended to receive respective dispensers, first conveyor means adapted to receive said containers from said first feeder means, second conveyor means adapted to receive said dispensers in succession, second feeder means adapted to feed said dispensers in succession to said second conveyor means, and third conveyor means for receiving said containers and said dispensers respectively from said first conveyor means and said second conveyor means, wherein said second conveyor means comprise a conveyor provided with a plurality of housings adapted to receive respective dispensers and to support them rotatably about their respective axes, there being provided a fixed abutment element arranged adjacent to said conveyor and adapted to interfere with at least part of the peripheral surface of said dispensers to cause a rotation of said dispensers about their respective axes during their movement by virture of said conveyor, means for sensing the position assumed by a given portion of each of said dispensers during its rotation about it own axis, and retention means supported by said conveyor for locking each of said dispensers within the related housing upon said sensing means detecting the attainment of a given position by said given portion of each of said dispensers.

2. Apparatus according to claim 1, wherein said first and second conveyor means are constituted by part of a same rotary conveyor, said second conveyor means surmounting said first conveyor means.

3. Apparatus according to claim 2, wherein said first and second conveyor means are constituted by part of a same rotary conveyor, said second conveyor means surmounting said first conveyor means, and wherein said abutment element is constituted by a fixed curved housing which is arranged adjacent to said second conveyor means and is adapted to interfere with at least a part of the periphery of said dispensers contained in said housings.

4. Apparatus according to claim 3, wherein said fixed curved housing is provided with a plurality of flexible tabs adapted to interfere with part of the periphery of said dispensers contained in said housings.

5. Apparatus according to claim 3, wherein said fixed curved housing has a covering made of a resilient material at its face directed toward said housings, said covering being adapted to interfere with part of the periphery of said dispensers contained is said housings.

6. Apparatus according to claim 1, wherein said sensing means are of the optical type and comprise photocell means adapted to identify a given region of said dispensers.

7. Apparatus according to claim 1, wherein said retention means comprise sucker means which lead to a choke of a duct internallly shaped like a Venturi tube, a source of compressed air being provided, said source being connectable to an end of said duct by said sensing means.

8. Apparatus according to claim 1, wherein said retention means comprise sucker means, a suction pump being provided which can be connected to said sucker means by said sensing means.

* * * * *